United States Patent [19]

Hoyle

[11] Patent Number: 4,717,004
[45] Date of Patent: Jan. 5, 1988

[54] SELF-ADJUSTING CLUTCH MECHANISM

[76] Inventor: Edgar Hoyle, 193 The Street, Boughton, Faversham, Kent ME13 9BH, United Kingdom

[21] Appl. No.: 920,894

[22] Filed: Oct. 16, 1986

Related U.S. Application Data

[63] Continuation of Ser. No. 610,987, May 11, 1984, abandoned.

[30] Foreign Application Priority Data

Sep. 14, 1982 [GB] United Kingdom ............... 8226107

[51] Int. Cl.⁴ ............................................. F16D 13/75
[52] U.S. Cl. ............................... 192/111 A; 188/2 D; 192/70.25
[58] Field of Search ................ 192/111 A, 70.25; 188/2 D, 71.8, 196 B, 196 P

[56] References Cited

U.S. PATENT DOCUMENTS 2,187,636  1/1940  Story ........................ 192/111 A X
4,420,988  12/1983 Deligny ..................... 192/111 A X

FOREIGN PATENT DOCUMENTS 0048620  3/1982  European Pat. Off. .
0055649  7/1982  European Pat. Off. .
2278982  2/1976  France .
1409527  10/1975 United Kingdom .

Primary Examiner—Martin P. Schwadron
Assistant Examiner—Stephen M. Hepperle
Attorney, Agent, or Firm—Dennison, Meserole, Pollack & Scheiner

[57] ABSTRACT

An engine clutch control mechanism which incorportes a flexible remote control cable comprising a core (1) which is axially displaceable within a conduit (2), is provided with a self-adjustment means for compensating for clutch wear. The self-adjustment means comprises a conduit-anchoring device (14) for anchoring the conduit (2) to an abutment (5) held by a fixture (4). When the conduit-anchoring device is in its operative position it makes tooth engagement with the conduit. The conduit-anchoring device is connected to the core (1) via a yielding coupling (12) so that the said device (14) is displaced into conduit-engaging position by force transmitted to it from the core during an initial part of the operative stroke of the core. Following anchorage of the conduit to the abutment (5) the operative stroke of the core continues to completion. On the return stroke the conduit anchorage becomes released to allow the conduit end to move relative to the abutment under any residual force exerted by the clutch return spring when the clutch pedal has reached the limit of its movement.

8 Claims, 9 Drawing Figures

SELF-ADJUSTING CLUTCH MECHANISM

This is a continuation of co-pending application Ser. No. 610,987 filed on May 11, 1984, now abandoned.

Cable control operated clutch systems require adjustment to compensate for wear of the clutch plates.

Clutch operating mechanisms have already been proposed wherein a clutch-releasing pull force is transmitted via a Bowden-type cable incorporating or associated with means which allows the effective length of the cable automatically to decrease at the end of the clutch-release movement of the clutch pedal or other actuating member if the cable is still subject to loading by the clutch spring. Examples of such mechanisms are disclosed in United Kingdom Pat. Nos. 1181920 and 1411467, United Kingdom Patent Applications 2 016 634A, 2 088 501A and 2 088 502A, and European Patent Application Nos. 0 030 494, 0 048 620 and 0 055 649.

The known mechanisms comprise a self-adjusting facility in the form of a coupling which as the pedal or other actuating member reaches the end of its return (clutch-engaged position) is caused to open to allow any necessary change in the effective length of the cable control to take place. In some of the mechanisms the coupling is effective between the cable control and a fixture; whereas in other mechanisms the coupling is between one section of the cable length and another.

The automatically releasing coupling principle is in itself satisfactory and mechanisms embodying this principle in the manner described in United Kingdom Pat. Nos. 1 181 920 and 1 411 467 have been used quite successfully. However there remains a need for mechanisms of alternative design to those so far proposed. The acceptability of a clutch control mechanism for use in any particular mass produced vehicle model depends upon a number of factors. These include performance specifications and production and maintenance costs.

Vehicle clutch control cables must satisfy very stringent performance specifications pertaining to efficiency and durability. Even in small private cars the transmitted load often exceeds 150 lbs, and the control mechanism must be capable of reliable performance through hundreds of cycles every day for at least several years.

It is evident that several of the mechanisms which have been devised in recent years and are described in the patent literature above referred to are of quite complex construction and would be too expensive for use in some mass produced vehicles.

It is an object of the invention to provide new forms of self-adjusting clutch control mechanism which are efficient and reliable, and can be produced at favourably low cost.

According to the present invention there is provided an engine clutch control mechanism incoporating a flexible remote control cable comprising an inner member (hereafter called "core") longitudinally displaceable within a guiding outer member (hereafter called "conduit"), and incorporating a coupling which as the pedal or other actuating member approaches the end of its return (clutch-engaging) movement releases to allow change in the effective length of the cable control to take place under any residual loading of the cable by the clutch return spring, characterised in that the control mechanism has the following features in combination:

an abutment located adjacent the cable control near one end of the conduit and via which axial load on the conduit can be transmitted to a fixture;

a conduit-anchoring device for anchoring the conduit against axial displacement relative to said abutment, which device is displaceable from a conduit-released position in a conduit-anchoring position, said device having at least one tooth which in the said conduit-anchoring position of the device intrudes between projections which are located at successive positions along at least part of the conduit so that they afford a succession of adjustment positions; and means forming a yield coupling between said conduit-anchoring device and the core, which coupling serves during an initial part of a clutch-releasing stroke of the core to transmit force from the core to the said conduit-anchoring device to cause displacement thereof into a said toothed engagement with the conduit but allows the clutch-releasing stroke to continue to completion while said toothed engagement is maintained.

When a mechanism according to the invention is installed it is normally necessary for the cable control, in its rest position, to be subjected to light axial force which is effective for taking up slack in the cable control. Such automatic take up of slack is well known per se in remote control systems employing a Bowden-type cable. As in known systems, the inherent loading for take up of slack in a mechanism according to the present invention can be maintained by a spring operating between the conduit and a fixture. This spring can be fitted at the time the mechanism is installed for use. Preferably however a suitable spring is provided as a inherent part of the mechanism and acts between the conduit and the aforesaid abutment.

The invention affords a number of advantages. Reliability of operation is promoted by a conduit anchorage which is of interlocking form and is functionally load-sensitive. A force-transmitting coupling between the core and a normally released conduit anchoring device ensures movement of that device into operative position at the commencement of the operating (clutch-releasing) stroke of the mechanism. And the force required for that purpose can be quite small because of the interlocking nature of the engagement between the anchoring device and the conduit. Once some degree of tooth engagement of the conduit has taken place the anchoring device can be further displaced towards fully interlocked position by the axial reaction force on the conduit resulting from the loading of the core. By virtue of the aforesaid force-transmitting connection between the core and the conduit-anchoring device there is no necessity to provide and house a spring for displacing the anchoring device into its operative position. Were reliance to be placed on such an operating spring it would be necessary to provide means to ensure release of the conduit anchoring device against the action of such spring at a critical moment in the return movement of the core.

A mechanism according to the invention can be of pull or of push type.

The mechanism can be of very simple and inexpensive construction.

The conduit may have at one or each end a rigid portion, e.g. a portion formed by a plastics or metal tube, in which case the or a said rigid portion can have the series of external projections for inter-engagement by the conduit-anchoring device. However in preferred embodiments of the invention the portion of the conduit with which the conduit-anchoring device co-operates is flexible. The projections can conveniently be formed by one or more helically wound wires. It is an advantage of the interlock between the anchoring device and the conduit that reliable anchorage of the conduit does not depend upon the presence of a rigid conduit portion for engagement by the anchoring device. By dispensing with a rigid end component which must be connected to the flexible part of the conduit, important cost savings can be achieved. Moreover if the flexible conduit extends right through the abutment the projecting end portion of the conduit can be deflected relative to the abutment under abaxial forces such as may be imposed when the core is connected to a pivoting actuating member.

In certain embodiments of the invention the conduit anchoring device and the abutment make sliding or rolling contact and co-operate to cause progressive movement of the anchoring device towards the conduit by wedge action during movement of such device by the core. This feature is one which favours a simple and inexpensive construction together with reliability of operation. In some advantageous forms of the mechanism it incorporates a component having a first part which forms the conduit-anchoring device and co-operates wedge-fashion with the surrounding abutment, and a second part which engages the core sufficiently firmly to ensure that movement of the core will be accompanied by movement of the said component untili its said first part has moved inwardly to engage the conduit. The aforesaid component can extend right through the abutment and have a degree of elastic flexibility in planes containing the axis of the component so that it can elastically flex under abaxial force exerted by the core. The said component can for example be formed of synthetic polymeric material. Simplicity and low cost can be promoted by forming this component as a one-piece moulding. The co-operating abutment can likewise be formed of synthetic polymeric material.

The invention includes mechanisms in which the conduit-anchoring device is connected to the core solely by friction. Reliance upon friction has the advantage that during the return (clutch-engaging) stroke of the core the anchorage of the conduit is released whenever the residual loading in the cable falls below the frictional resistance to displacement of the core relative to the anchoring device. There is therefore no need, when installing the mechanism, for a precise pre-adjustment of the mechanism to ensure that the core occupies a predetermined position in relation to the anchoring device at a predetermined point in the return stroke of the core. In this sense the installation is free from inconvenient dimensional sensitivity, and this is very beneficial e.g. in facilitating installation of the mechanism regardless of vehicle build tolerances. The required frictional restraint on movement of the core relative to the conduit-anchoring device can be achieved for example by providing this device with an associated passageway for the core which obliges the core to follow a non-rectilinear path therethrough. In the case of a pull-type control it is advantageous for this path to be defined by a tube which tends to straighten under tensile load in the core and thereby reduces the directional changes in the engaged part of the core. In these circumstances the desirable result ensues that the frictional restraint imposed by the anchoring device on the cable movement decreases during the operative stroke of the core.

As an alternative to a purely frictional engagement between the core and the conduit-anchoring device, a fastening comprising inter-engaging parts can be provided which fastens when the core and said anchoring device are in a particular relative position, the inter-engagement being weak enough to ensure release of the core for movement relative to the conduit-anchoring device when this becomes interlocked with the conduit during the operative stroke of the mechanism. A said inter-engaging type of fastening has the advantage that the conduit-anchoring device need not impose any frictional restraint on the movement of the core once the conduit has become anchored and the fastening has become released. As is hereafter exemplified there may be provision for variation of the relative positions in which the conduit-anchoring device and the core become fastened together.

In some embodiments of the invention, the conduit anchoring device is permanently connected to the core of the cable via a spring. Some force is transmitted to the conduit-anchoring device via such spring during the entire operative stroke of the mechanism. However that force is secondary to the action of the load on the cable in keeping the anchoring device in conduit-anchoring position, and is not relied upon for that purpose.

The connection between the conduit-anchoring device and the core of the cable can be an indirect connection, e.g. it can be via a pedal or other actuating member to which the core is connected.

In order to allow the required interlocking engagement between the conduit-anchoring device and the conduit the latter is provided with projections located in succesion along at least part of the conduit so as to allow stepwise adjustment of the position at which the conduit becomes anchored relative to the abutment. The projections afford successive thrust faces for co-operating with the tooth or teeth of the conduit-anchoring device. Such thrust faces can be normal or substantially normal to the axis of the conduit but this is not essential, particularly if a plurality of such thrust faces are simultaneously engaged by the conduit-anchoring device. If the conduit-anchoring device is one which becomes displaced inwardly towards the conduit by wedge action the interlocking of these components is still necessary for the purposes of the invention but the strength of the interlock in the fully interlocked position of such components is somewhat less important.

Various embodiments of the invention, selected by way of example, will now be described with reference to the accompanying drawings, in which.

Figure 1:
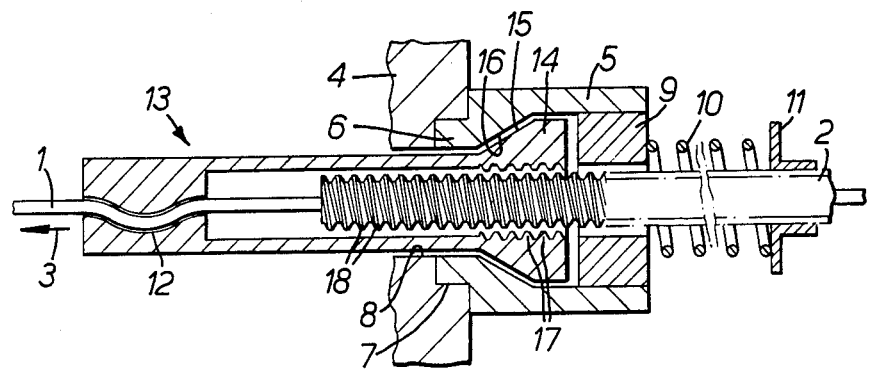
FIG. 1 is a cross-sectional elevation of part of one clutch-control mechanism according to the invention.
Figure 3:
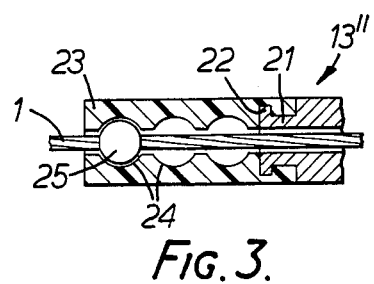
Figure 4:
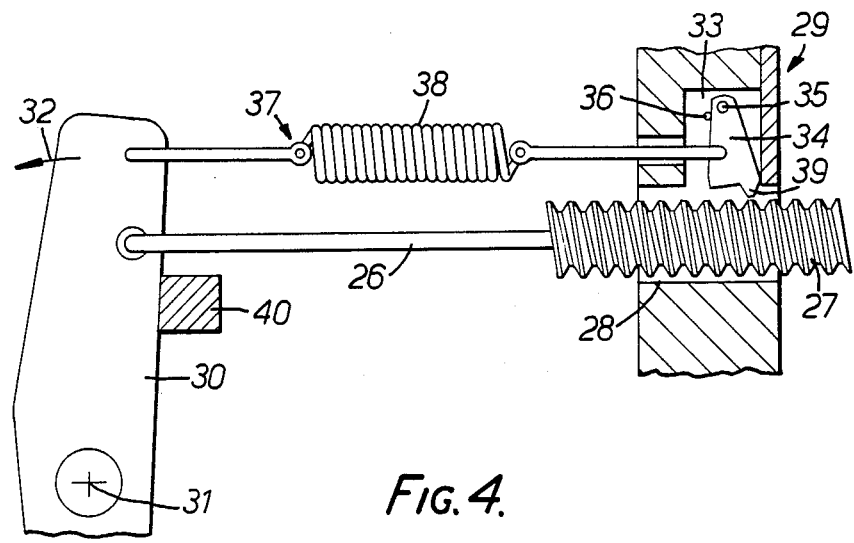
Figure 5:
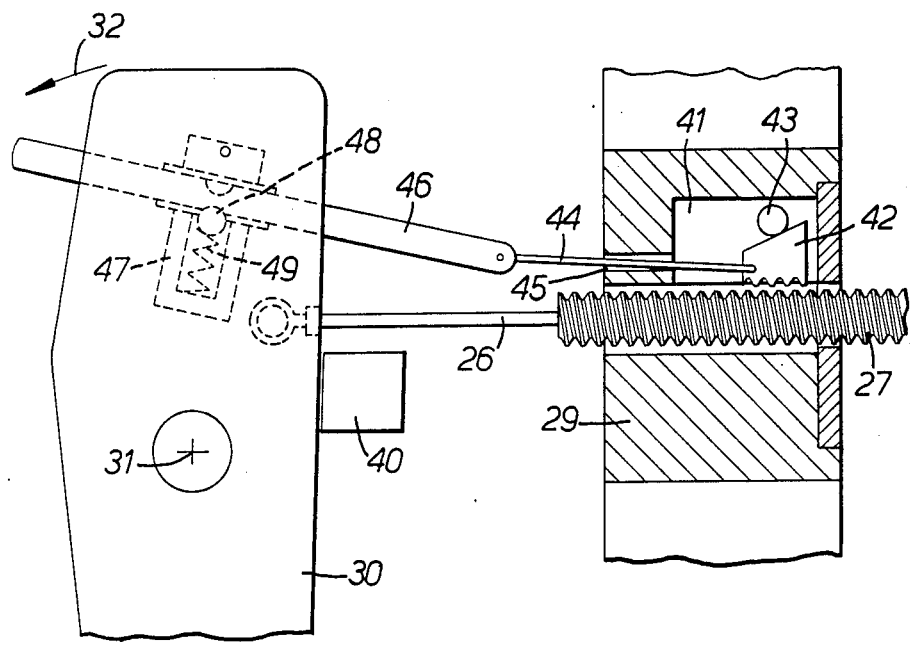
Figure 6:
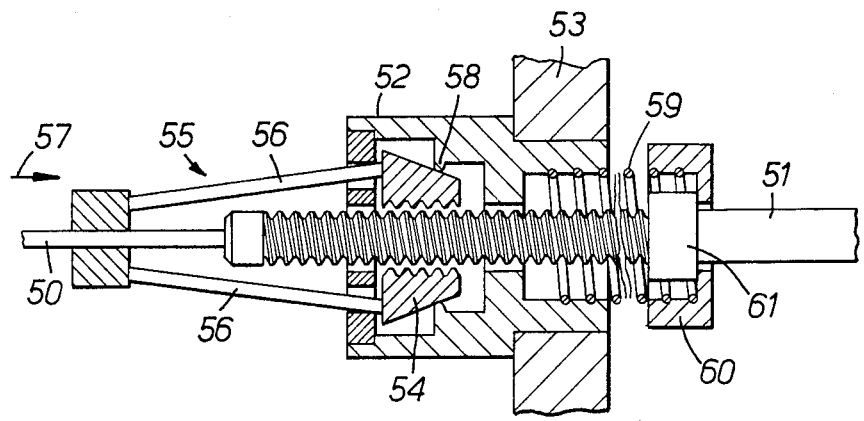
Figure 7:
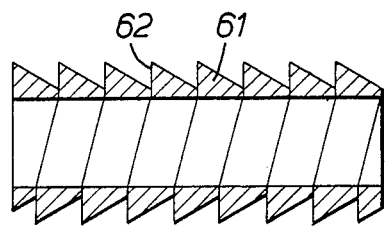
Figure 8:
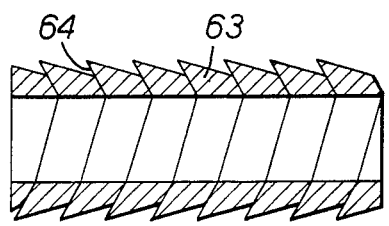
Figure 9:
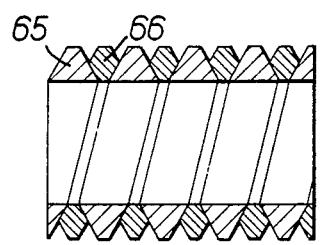

FIG. 3. is a detail of an alternative modification of FIG. 1;

FIGS. 4 to 6 are cross-sectional elevations of three further mechanisms according to the invention; and FIGS. 7 to 9 are cross-sections of parts of three different forms of conduit which can be used in carrying out the invention.

FIG. 1 shows part of a clutch-control mechanism near its force-input end, i.e. at the end where the pedal or other clutch-actuating member (not shown) is located. The mechanism incorporates a Bowden-type control cable of pull type via which force applied to the actuating member is transmitted along a curved path. The cable comprises a core 1 slidable within a guiding conduit 2. The core is connected at what in aspect of the figure is its left-hand end to the actuating member. The other end of the core is connected to a clutch-release lever. When an actuating force is applied to the actuating member the core is loaded in tension and is pulled in the direction of arrow 3, causing the clutch to be released against the action of its return spring. In order that this transmission of clutch releasing force can take place the conduit 2 must be anchored against displacement with the core. At or near its right-hand end (not shown) the conduit is secured to a fixture against axial displacement relative thereto. Near its illustrated end, the conduit is connected to a fixture 4 by means of a releasable coupling hereafter described.

A tubular abutment 5 is secured to the fixture 4, which may for example be a bulkhead of the vehicle engine compartment. For this purpose the abutment 5 has a spigot 6 which is accommodated in a recess 7 surrounding a hole 8 in the fixture. The spigot can for example be a force-fit in such recess or the spigot and recess can be threaded for screw connection. At its right-hand end the abutment is fitted with an end plug 9 which provides a bearing face for a compression spring 10 the other end of which bears against an annular flange on a ring 11 which is swaged onto the conduit 2. The spring 10 serves to hold the conduit under a light tension and to take up any slack. The plug 9 also serves as a stop limiting the free play of the device 13.

A generally tubular component 13 surrounds the illustrated end portion of the conduit and part of the projecting end portion of the core 1. An end part 14 of this device 13 is enlarged and is shaped with a frusto-conical face 15 which opposes a frusto-conical face 16 of similar cone angle on the inside of the abutment 5. Over part of the length of the component, including its said enlarged end part 14, its circumferential continuity is interrupted by longitudinal slotting of the tube so that such enlarged end part can be radially inwardly displaced towards the conduit 2. The smaller diameter part of the said tubular component 13 projects from the abutment and extends beyond the adjacent end of the conduit 2. The free end portion of that smaller diameter part is formed with a longitudinally curved passageway 12 of such cross-sectional size that it obliges the surrounded portion of the core 1 to undergo directional changes. In consequence the said free end portion of the conduit anchoring device lightly grips the core.

As a result of this frictional engagement between the tubular component 13 and the core 1, when an actuating force is initially applied to the core 1 to pull it in the direction of arrow 3, the said tubular component becomes displaced together with the core over a certain distance. One increment of this displacement takes up the clearance between the frusto-conical faces 15,16 of the component 13 and the abutment 5 and the following increment of the displacement causes the enlarged end part 14 of the tubular component, which forms the conduit-anchoring device, to be displaced inwardly towards the conduit by the wedge action which occurs as the face 15 commences to slide in contact with the face 16. The interior surface of the enlarged end portion 14 of the component 13 is shaped to define teeth 17 for intermeshing with projections 18 on the exterior of the conduit 2. Once the component 13 has moved axially sufficiently to cause its teeth 17 to intrude between projections 18 on the conduit and flanks of those teeth are in contact with flanks of those projections, the component 13 is blocked against continued movement with the core and the latter continues its movement alone, against the light frictional resistance imposed by its contact with the wall of the curved passageway 12. Following this arrest of the component 13, a further slight radially inward displacement of the enlarged end part 14 of the component 13 takes place which causes it fully to interlock with the projections 18 on the conduit and exert firm clamping pressure on the conduit. The conduit is therefore firmly anchored against displacement during the continued displacement of the core whereby the clutch is released. The load on the core imposes compressive loads on the length of the conduit located between its end anchorages and as this compressive load is transmitted to the tubular component 13 and urges it to the left in the FIG. 1 aspect, the load tends to maintain the clamping pressure on the conduit.

The wedge-clamp form of the device 14 and the interlocking engagement of the device 14 with the conduit, combine to make the anchorage of the conduit effective even if the component 13 is subject to some degree of side or abaxial loading tending to skew it within the abutment. The component 13 is self-aligning. This component can moveover have some capability of flexure under side loading imposed by the core 1.

During the relaxation of the pull force on the core whereby the clutch is allowed to move towards engagement under the force exerted by the clutch return spring, the compressive load on the conduit progressively decreases, but it nevertheless holds the tubular component 13 against return movement with the core and the core slides through the curved end passageway 12. However, before the pedal or other actuating device reaches it original rest position, against a stop, the residual compressive load on the conduit falls below the axial force exerted on the tubular component 13 by the core by its frictional contact with the passageway 12 and the component 13 will therefore be displaced so that the co-operating frusto-conical faces 15,16 separate and the conduit-anchoring device 14 moves away from the conduit under the elastic recovery forces in the component 13. The conduit is therefore then free for axial displacement relative to the abutment 5. If clutch plate wear has occurred during the frictional sliding contact of the clutch plates the control cable will still be subject to some loading by the clutch return spring when the actuating member has reached the limit of its travel and this residual loading will cause the illustrated end of the conduit 2 to move slightly to the left in the aspect of FIG. 1, relative to the component 13. Automatic adjustment will occur if and when the cumulative wear becomes sufficient to cause each of the teeth 17 to engage the conduit one step (equal to the pitch of the teeth and of the projections 18) further from the end of the conduit when the anchoring device 14 next closes onto the conduit. The effect of such leftward movement is that the effective length of the mechanism is slightly altered to compensate for the wear.

In the illustrated mechanism for projections 18 are convolutions of a thread constituted by parts of a helically wound wire forming or forming part of the wall of the conduit 2 of the control cable. The gauge of the wire influences the pitch of the thread which in turn determines the smallest adjustment increment which occurs. As an alternative construction the projections could be integral portions of a suitably shaped rigid tube forming an end portion of the conduit.

It is advantageous for the tensioning spring which takes up slack to be of a variable rate for keeping the tensioning force as constant as possible over the adjustment range of the mechanism. To this end one or more springs of leaf or other type alternative to a helical spring 10 can be used if desired.

The described mechanism can be produced at relatively low cost. The tubular component 13 can be a one-piece moulding of a reinforced or unreinforced synthetic polymeric material, e.g. an acetal resin. As an alternative, the said component can be a metal component or it can comprise a combination of metal and plastics parts. The abutment 5 can likewise be made of synthetic polymeric material or metal. Preferably however the abutment is made of a said synthetic material. It is particularly advantageous, particularly for keeping production costs low, to use synthetic polymeric material for both the component 13 and the abutment 5. For promoting low frictional restraint to relative sliding movement of these parts it is recommended that they be made of different synthetic polymers. It is very suitable for example to use an abutment 5 of nylon or polypropylene for co-operating with a component 13 made of an acetal resin.

The core 1 can for example be a covered or uncovered stranded wire cable. It is advantageous for the core to have a plastics coating for contacting the wall of the passageway 12.

Figure 2:
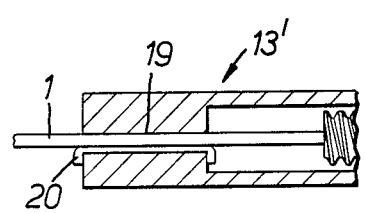
FIG. 2 is a detail of a modification of FIG. 1.

FIG. 2 illustrates an alternative form for the free end of the component 13. In this form, the free end of the component, designated 13', has a straight guiding passageway for the cable core 1 and a leaf spring 20 is fitted to the said component so that it extends along that passageway and exerts a light pressure on the core, holding it pressed against the opposite wall portion of the passageway. There may be more than one such leaf spring in the passageway. According to a further alternative (not illustrated) the passage 17 in FIG. 1 is made straight and of sufficient size to allow passage of the core 1 with clearance, and an inherently curved but elastically deformable tube having a bore of fractionally larger diameter than the core is secured to the end of the component 13 to form an extension of the passageway 17. As tension is applied to the core it tends to straighten the said tube and the frictional restraint on movement of the core relative to the tube is thereby reduced.

FIG. 3. shows the free end portion of another form of the component providing the conduit-anchoring device, designated 13". The remainder of the component can be of the same form as the component 13 in FIG. 1. The tubular stem of the component is formed with a short end-spigot 21 with an integral radial flange 22. A extension piece 23 made of a synthetic elastomer is formed to fit onto that spigot and interlock with the flange 22. The extension piece has a core-guiding passageway which has three locally enlarged zones 24, each shaped to accommodate a bead 25 which is swaged or otherwise secured to the core 1 of the control cable. FIG. 2 illustrates the parts in the relative positions which they occupy in the rest position of the control. When a pull force is initially applied to the core the component 13" moves with the core by virtue of the location of the bead 25 in one of the accommodating zones 24 in the extension piece 23. However as soon the axial displacement of the component 13" is arrested by the inter-engagement of the component with the conduit of the control cable the extension piece becomes deformed by the pressure exerted by the bead 25 so that the bead escapes from the extension piece. As the pedal or other actuating member approaches its rest position during the subsequent clutch-engaging stroke of the mechanism the bead 25 re-enters the extension piece and pushes the component out of conduit anchoring position as soon as the residual compressive load on the control cable conduit falls below the force exerted on the extension piece 23 by the bead 25. The purpose of providing three accommodating zones 24 for the bead is to allow alternative initial settings of the mechanism. The mechanism can accommodate itself by movement of the bead into one or the other of the zones 24, to vehicle body or other installation build tolerances. During the repetitive operations of the control the bead will always return to the zone 24 in which it was initially located.

Reference is now made to FIG. 4. The control cable in the mechanism shown in this figure comprises a core 26 and a guiding conduit 27 having over at least a part of its length an external toothed profile. The illustrated end portion of the conduit extends through an aperture 28 in a fixed abutment 29. This abutment may for example be a bulkhead forming part of an engine compartment structure. At the remote end of the cable the core is connected to a clutch plate lever and the conduit is anchored to another fixture. At the illustrated end of the control cable, the core is connected to a clutch pedal arm 30 shown in its rest position. When the pedal is depressed to release the clutch against the action of its return spring the arm 30 pivots about axis 31 in the direction of arrow 32, so applying a pull force to the core 26. Within the abutment there is a recess 33 within which a conduit-anchoring device comprising a pawl 34 is housed. The pawl is rockable about a pin 35 against the force exerted by a torsion spring 36 which urges the pawl into its illustrated inoperative position. The pawl is connected to the pedal arm 30 by a wire linkage 37 incorporating a tension spring 38. When the clutch pedal is depressed to release the clutch the force transmitted to the pawl 34 from the pedal arm 30 via the linkage 37 causes the pawl to rock about its pivot into a position in which a tooth 39 on the toe of the pawl intrudes between neighbouring teeth of the conduit profile and exerts firm pressure on the conduit, so holding it against axial displacement. During the continued axial displacement of the core the pawl 34 remains held in its operative position by the increasing force transmitted to it via the linkage 37. As the pedal approaches its rest position on the subsequent return, clutch-releasing stroke, of the mechanism, the force transmitted through the linkage 37 falls to a level such that it no longer overcomes the effect of the torsion spring 36 and the pawl therefore releases the conduit. In consequence the illustrated end portion of the conduit is free to move axially relative to the abutment 29 and it will do so under the residual axial loading (if any) imposed on the control cable by the clutch return spring when the pedal has reached the limit of its movement determined by stop 40. Clutch wear is therefore compensated for when it is sufficient to cause the pawl 34, when it next moves into operative position, to engage behind the next tooth 27 on the conduit.

It is very advantageous for the spring 38 to be of variable rate for avoiding or minimising increases in its resistance to the pedal movement over the pedal movement range. As an alternative to the helical spring, one or more springs of leaf or other type can be used.

FIG. 5 illustrates a modified form of the mechanism shown in FIG. 4. Corresponding parts in the two figures are denoted by the same reference numerals. Within the abutment 29 of the FIG. 5 mechanism there is a recess 41 just wide enough to accommodate a wedge 42 and serve as a guideway for this wedge in its lateral movements in the plane of the drawing. The sloped top face of the wedge co-operates with a cylindrical stop 43 fixed in the recess 41. The wedge 42 is connected to a wire 44 which makes a close sliding fit in a hole 45 formed in a wall portion of the abutment 29. The wall of this hole supports the wire 44 so that in the illustrated axial position of the wire the wedge 42 is out of engagement with the conduit 27. The end of wire 44 remote from the wedge is pivotally connected to a rigid bar 46 which extends through the upper end portion of the pedal arm 30, which is forked for that purpose. Within that fork there is a catch device 47 through which the bar 46 is slidable and which is pivotally connected to the pedal arm so that the orientation of the catch device relative to the arm can alter to suit the changing direction of the bar 46 during the rocking of the pedal arm. The bar 46 has an indent which in the illustrated position of the parts is engaged by a ball 48 housed in the catch device 47. The ball is biased towards the bar by a spring 49. When the clutch pedal is depressed to release the clutch the bar 48 is pulled to the left by the force transmitted to it via the catch device 47. This movement of the bar continues until the wedge 42 is displaced by the stop 43 into interlocking engagement with the conduit 27. The movement of the wedge towards the conduit which must occur for this purpose is allowed by the flexibility of the wire 44. Once the wedge interlocks with the conduit to anchor it against axial movement, the continued movement of the pedal arm forces the ball 48 of the catch device out of engagement with the bar 46 indent and the catch device thereafter slides along the bar. As the pedal arm approaches its rest position, against stop 40, on the return stroke of the mechanism, the catch device again engages the indent in the bar and the wedge consequently becomes pushed into its illustrated inoperative position. Consequently, any necessary adjustment of the conduit for compensating for clutch wear can take place in the same way as in the mechanism shown in FIG. 4. The stop 43 could be a rotatably mounted roller.

The cable control of the mechanism according to FIG. 5 is maintained under a light tension which ensures take-up of slack. This tensioning force can be exerted by a compression spring acting between the abutment 29 and the conduit or at some other part of the system.

FIG. 6 shows an example of how the invention can be embodied in a push-type control. In the FIG. 6 mechanism the control cable comprises a core 50 and a conduit 51. The core is of a construction permitting it to transmit the necessary compressive loads, while the conduit must be capable of resisting extension under the tensile reaction forces. Suitable constructions of push-type flexible remote control cables are well known per se. The end portion of the core at the force input end (which is to the left in the aspect of FIG. 6) can be formed by a rigid rod so that the part of the core which is unsupported by the guiding conduit during an operating cycle is resistant to buckling under heavy load. An abutment 52 is secured in a fixture 53. The abutment houses wedges 54 which form parts of a component 55 and which have teeth for interlocking with the toothed profile of the conduit 51. Two wedges are apparent in the drawing. There may be more than two wedges if required, angularly spaced around the conduit. The wedges are carried by elastically flexible arms 56 projecting from a hub portion 56 at the extremity of the component 55. This hub portion has a bore in which the core 50 is lightly gripped. The frictional engagement of the core by the hub portion is sufficiently strong to ensure that the component 55 accompanies the core in the initial part of its movement in the direction of arrow 57 responsive to a push load applied via the pedal or other clutch actuating member. This movement of the component 55 causes the wedges 54, by virtue of their co-operation with bearing faces 58 on the abutment, to be displaced inwardly into interlocking engagement with the conduit. Thereupon the conduit is anchored against displacement and the core continues it movement relative to the component 55. As the actuating member approaches the limit of its return, clutch-engaging stroke, the tensile loading of the conduit 51, which tends to keep the wedges 54 in their conduit-clamping positions, falls below the opposing force exerted on the component 55 as a result of its frictional engagement with the core and that force pulls the wedges away from the bearing faces 58 so that the conduit is released. Should any clutch wear have taken place the core 50 will remain loaded in compression by the extraneous or inherent clutch return spring when the pedal or other actuating member has reached the limit of its travel. The resulting tension in the conduit will cause its illustrated end to move to the right in the aspect of FIG. 6, relative to the abutment 52. The effect of this movement is that the effective length of the cable control is altered to compensate for the clutch wear.

The cable control is maintained under a light compressive force by a tension spring 59 one end of which is held in a helical groove in the abutment 52 and the other end of which is held in a helical groove in a cap 60. The spring keeps the cap pressed against a collar 61 secured to the conduit.

FIGS. 7 to 9 show three of many possible toothed conduit profiles which can be achieved by helically winding a wire or a pair of wires. The profile shown in FIG. 7 is formed by helically winding a single wire 61 of a trapezoidal cross-section such that the teeth have thrust faces 62 substantially normal to the axis of the conduit. The wire 63 used for forming the conduit shown in FIG. 8 has a cross section such that the teeth have raked thrust faces 64. The conduit represented in FIG. 9 is formed by helically winding two wires 65 and 66.

A mechanism according to the invention can of course combine features embodied in different illustrated embodiments. For example: a stop or pin similar to stop 43 in FIG. 5 can be used to co-operate with a tubular conduit-anchoring device as shown in FIG. 1; a conduit-anchoring device comprising a pivoted pawl like pawl 34 in FIG. 4 can be connected to a part is formed to engage with the core solely by friction; or a conduit-anchoring device which grips the conduit by wedge action like the part 14 in FIG. 1 can be connected indirectly to the core, e.g. via the pedal or other actuating member, by means of an extensible linkage like linkage 37 in FIG. 4.

The flexible control cable used in carrying out the invention can if desired be of a form, known per se, wherein the core is formed by a flat metal strip supported by caged bearings within the guiding conduit. However it will generally be more economical to employ a control cable of a more common form comprising a long-lay stranded wire core, the long-lay wire bundle being bound together by a wrapping wire or strip in the case that the core is to transmit push loads.

While the illustrated mechanisms have been described with particular reference to their function in compensating for clutch wear, their self-adjusting action is effective for compensating for wear at other locations in the clutch control installation.

While the invention has been described in its application to engine clutch control, a mechanism according to the invention can be used for the remote control of other elements or devices in which similar conditions occur which make automatic adjustment facility beneficial.

What is claimed is:

1. An engine clutch control mechanism incorporating a flexible remote control cable comprising a conduit (2,51); a core (1,50) longitudinally displaceable with said conduit (2,51); an abutment (5,29,52) which is located adjacent the cable control near one end of the conduit (2,27,51) and via which axial load on the conduit can be transmitted to a fixture (4,53), and a conduit-anchoring device (13,13',55) which anchors the conduit against axial displacement relative to said abutment during each operative (clutch-disengaging) stroke of the core (1,26,50) but automatically releases the conduit as the core approaches the end of its return (clutch-engaging) stroke thereby to allow change in the effective length of the cable control to take place under any residual loading of the cable by the clutch-return spring; said conduit-anchoring device (13,13'55) being a one-piece (or "unitary") component having a first part comprising toothed jaws (14,54) each having a wedging surface which, on axial displacement of said component in a certain direction, cooperate wedge-fashion with a wedging surface on said abutment (5,29,52) and thereby become radially inwardly displaced so that the jaw teeth intermesh with a series of teeth (18) which is provided along at least part of the conduit so as to provide a series of adjustment positions, and a second part (13a) having a bore through which the core (1,26,50) passes and through which it is slidable against a frictional resistance which thereby forms a friction coupling between said component and the core, which coupling serves during an initial part of each clutch-disengaging stroke of the core to transmit force from the core to the said component (13,13',55) thereby to cause its said axial displacement and toothed engagement with the conduit whereafter said coupling allows such clutch-disengaging stroke to continue to completion while said toothed engagement is maintained.

2. An engine clutch control mechanism according to claim 1, wherein said friction coupling is formed by a spring which is mounted in said first portion (13'a) of the collet (13') and bears against the core (1).

3. An engine clutch control mechanism according to claim 1, wherein the bore in said second part (13a) of said conduit anchoring device (13) is of such form that it obliges the core (1) to follow a non-rectilinear path therethrough.

4. An engine clutch control mechanism according to claim 1 or 2, wherein said conduit teeth (18) are on a portion of the conduit which is flexible, said teeth being formed by helically wound wire convolutions.

5. An engine clutch control mechanism incorporating a flexible remote control cable comprising a conduit (2,51) having a series of teeth (18) distributed along at least a portion of its length; a core member (1,50) longitudinally displaceable within said conduit (2,51); an abutment (5,52) which is positioned adjacent the cable control and via which axial load on the conduit can be transmitted to a fixture (4,53); a collet (13,13',13",55) for anchoring said conduit against axial movement relative to such abutment during each operative (clutch-disengaging) stroke of the core; said collet having a first portion (13a,13'a,23,55a) which surrounds a part of the core member which projects from said conduit, and a second portion integral with said first portion and comprising jaws (14,54) which are angularly spaced around said conduit (2,51), said jaws having teeth (17,42a,54a) for selectively intermeshing with said conduit teeth (18); said collet (13,13',13",55) occupying, when the mechanism is at rest, i.e. in the clutch-engaged condition, an inoperative relaxed position in which said jaws are naturally open and allow said series of conduit teeth (18) to move axially relative to said jaws so that automatic adjustment of the effective length of the control cable can take place under any residual loading of the cable by the clutch return spring; means (12,20,24-25,-55a) which forms a yielding coupling between said first portion (13a,13'a,23,55a) of said collet (13,13',13",55) and said core member (1,50), which coupling affords sufficient resistance to axial movement of said core member relative to said collet to ensure that during an initial part of each clutch-disengaging stroke of the core member, said collet moves axially together with the core member under force transmitted from said core member to said collet via said yielding coupling; and means (16,58) on said abutment which cooperate with a wedging surface on said jaws (14,54) responsive to such axial movement of the collet to cause said jaws to be radially inwardly displaced by wedge action thereby to initiate an intermeshing toothed engagement between said jaws and said conduit whereby said conduit becomes anchored by said collet against axial displacement relative to said abutment (5,52); whereafter said coupling yields to allow said clutch-disengaging stroke of the core member to continue while said toothed engagement is maintained.

6. An engine clutch control mechanism according to claim 5, wherein there is means (12,20,55a) which imposes a frictional resistance to axial movement of said core member (1,50) relative to said collet (13,13',55) and said yielding coupling is constituted by said frictional resistance.

7. An engine clutch control mechanism according to claim 6, wherein said means imposing said frictional resistance is spring means (20) means is mounted in said first portion (13'a) of the collet (13') and bears against the core member (1).

8. An engine clutch control mechanism according to claim 5 or 6, wherein said conduit teeth (18) are on a portion of the conduit which is flexible, said teeth being formed by helically wound wire convolutions.

* * * * *